(12) United States Patent
Ferrer Almazan

(10) Patent No.: US 11,173,942 B2
(45) Date of Patent: Nov. 16, 2021

(54) STEERING CONTROL SYSTEM FOR SNOW VEHICLES

(71) Applicant: Pablo Ferrer Almazan, Saragossa (ES)

(72) Inventor: Pablo Ferrer Almazan, Saragossa (ES)

(*) Notice: Subject to any disclaimer, the term of this patent is extended or adjusted under 35 U.S.C. 154(b) by 251 days.

(21) Appl. No.: 16/393,309

(22) Filed: Apr. 24, 2019

(65) Prior Publication Data

US 2019/0248401 A1 Aug. 15, 2019

Related U.S. Application Data

(63) Continuation of application No. PCT/ES2017/000155, filed on Dec. 23, 2017.

(51) Int. Cl.
*B62B 13/12* (2006.01)
*B62M 27/02* (2006.01)
*B62B 13/08* (2006.01)

(52) U.S. Cl.
CPC .............. *B62B 13/12* (2013.01); *B62B 13/08* (2013.01); *B62M 27/02* (2013.01); *B62M 2027/021* (2013.01); *B62M 2027/025* (2013.01); *B62M 2027/026* (2013.01); *B62M 2027/027* (2013.01)

(58) Field of Classification Search
CPC ........ B62B 13/12; B62B 13/08; B62M 27/02; B62M 2027/021; B62M 2027/025; B62M 2027/026; B62M 2027/027
See application file for complete search history.

(56) References Cited

U.S. PATENT DOCUMENTS

| | | | |
|---|---|---|---|
| 1,068,883 A * | 7/1913 | Frank | B62M 27/02 180/185 |
| 2,583,507 A | 4/1949 | Carpenter et al. | |
| 2,664,446 A | 6/1950 | Richard et al. | |
| 3,550,706 A | 12/1970 | Watkins | |
| 3,734,219 A | 5/1973 | Christensen et al. | |
| 3,777,831 A | 12/1973 | Hale | |
| 3,885,641 A * | 5/1975 | Harris | B62K 13/00 180/185 |
| 5,102,153 A * | 4/1992 | Rhode | A63C 5/00 180/185 |
| 5,423,559 A * | 6/1995 | Rhode | B62K 13/00 280/12.14 |
| 5,433,466 A * | 7/1995 | Timmer | B62K 13/00 280/288.4 |

(Continued)

FOREIGN PATENT DOCUMENTS

WO WO0181160 11/2001
WO WO-2018078198 A9 * 9/2018 ........... B62B 17/065

*Primary Examiner* — Jacob D Knutson
(74) *Attorney, Agent, or Firm* — Miller Law Group, PLLC

(57) ABSTRACT

Steering control system for snow vehicles, suitable for equipping vehicles like snowmobile type or more specifically of the standing snowmobile style (1), with a basic configuration of, at least, two front skis (4a, 4b) and one drive track (3). The system acts on one or the other ski independently, and depending of the chosen path left or right, the rider can activate the left ski system or the right ski system using a mechanism that can be manual or assisted. This swing arms system (5a, 5b) and rotating ski spindle (6a, 6b) allow an easy and stable lateral tilt of the snowmobile, and besides generate a multiple and simultaneous orientation on the ski (4a) or (4b). All these factors gives the snowmobile high maneuverability and efficient control of the trajectory.

13 Claims, 6 Drawing Sheets

(56) References Cited

U.S. PATENT DOCUMENTS

| | | | | |
|---|---|---|---|---|
| 6,199,649 | B1* | 3/2001 | Alanko | B62B 13/08 |
| | | | | 180/186 |
| 6,279,925 | B1* | 8/2001 | Miller | B62B 13/12 |
| | | | | 280/14.1 |
| 7,815,003 | B2* | 10/2010 | Ferrer Almazan | B62M 27/02 |
| | | | | 180/190 |
| 2003/0159868 | A1* | 8/2003 | Alexander | B62M 27/02 |
| | | | | 180/190 |
| 2004/0016583 | A1* | 1/2004 | Pyykonen | B62M 27/02 |
| | | | | 180/193 |
| 2004/0238251 | A1 | 12/2004 | Oron et al. | |
| 2006/0232028 | A1 | 10/2006 | Pard et al. | |
| 2008/0029324 | A1 | 2/2008 | Plankenhorn | |
| 2008/0257627 | A1 | 10/2008 | Hues | |

\* cited by examiner

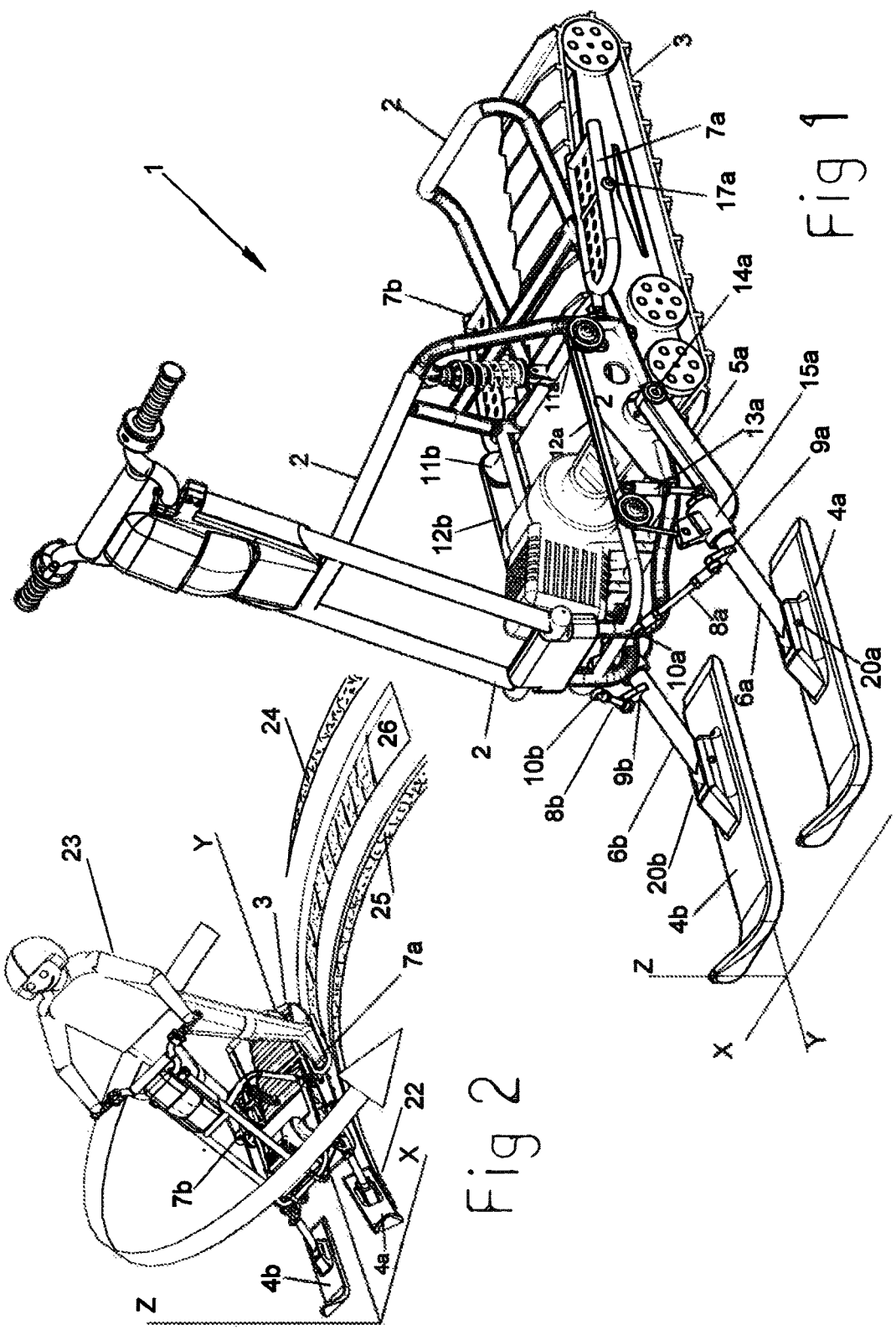

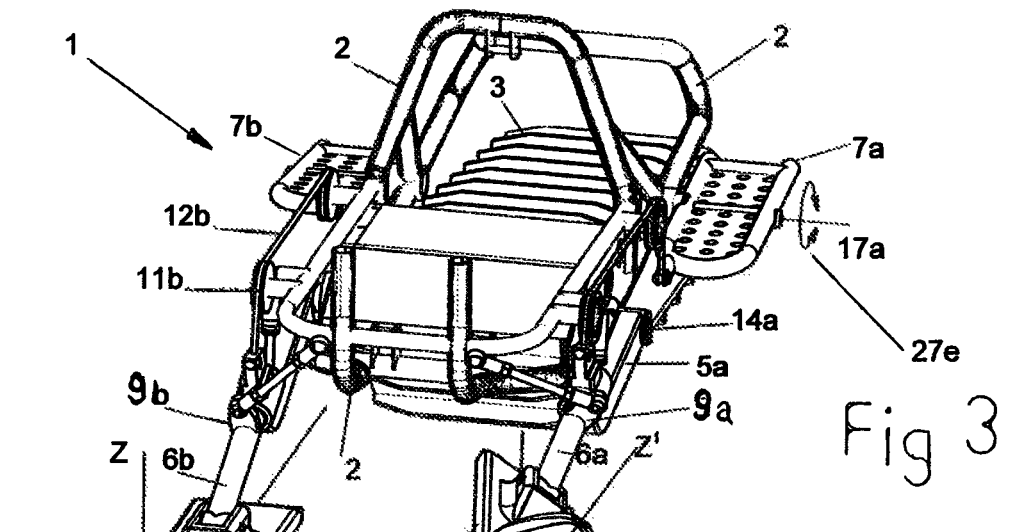
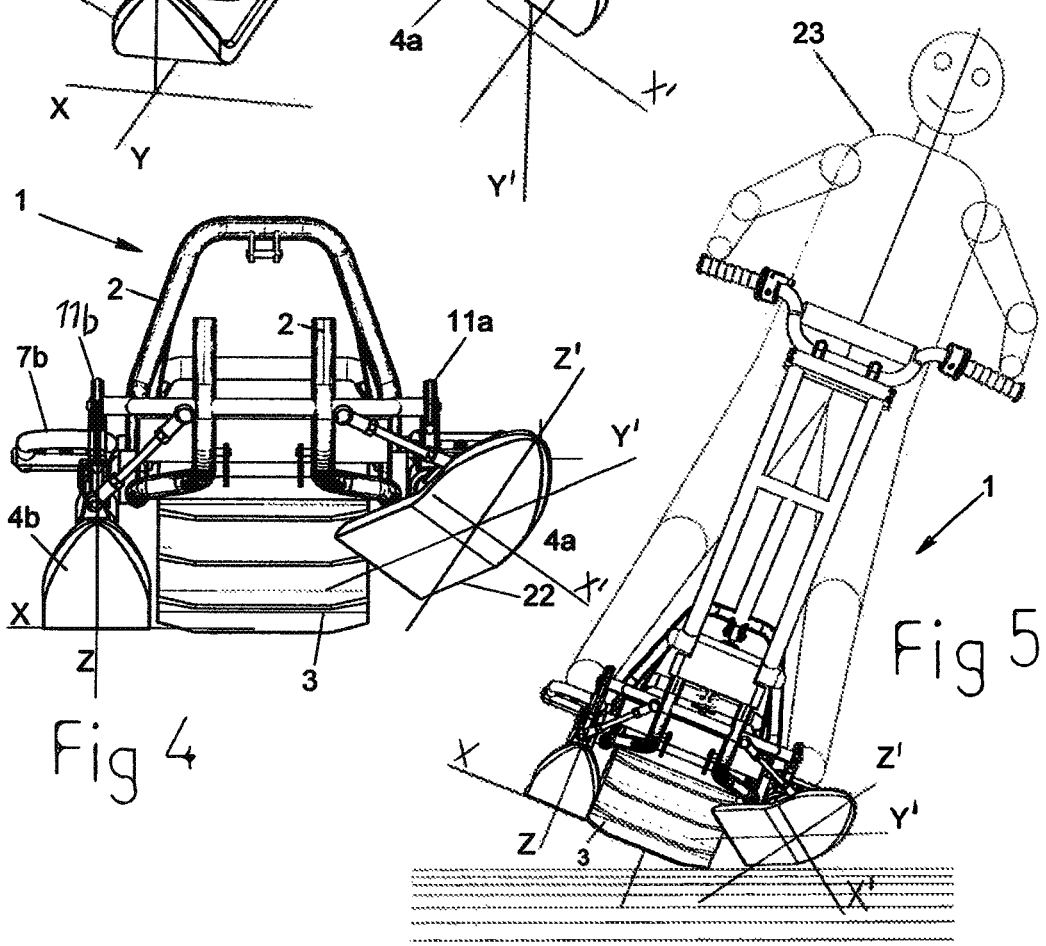

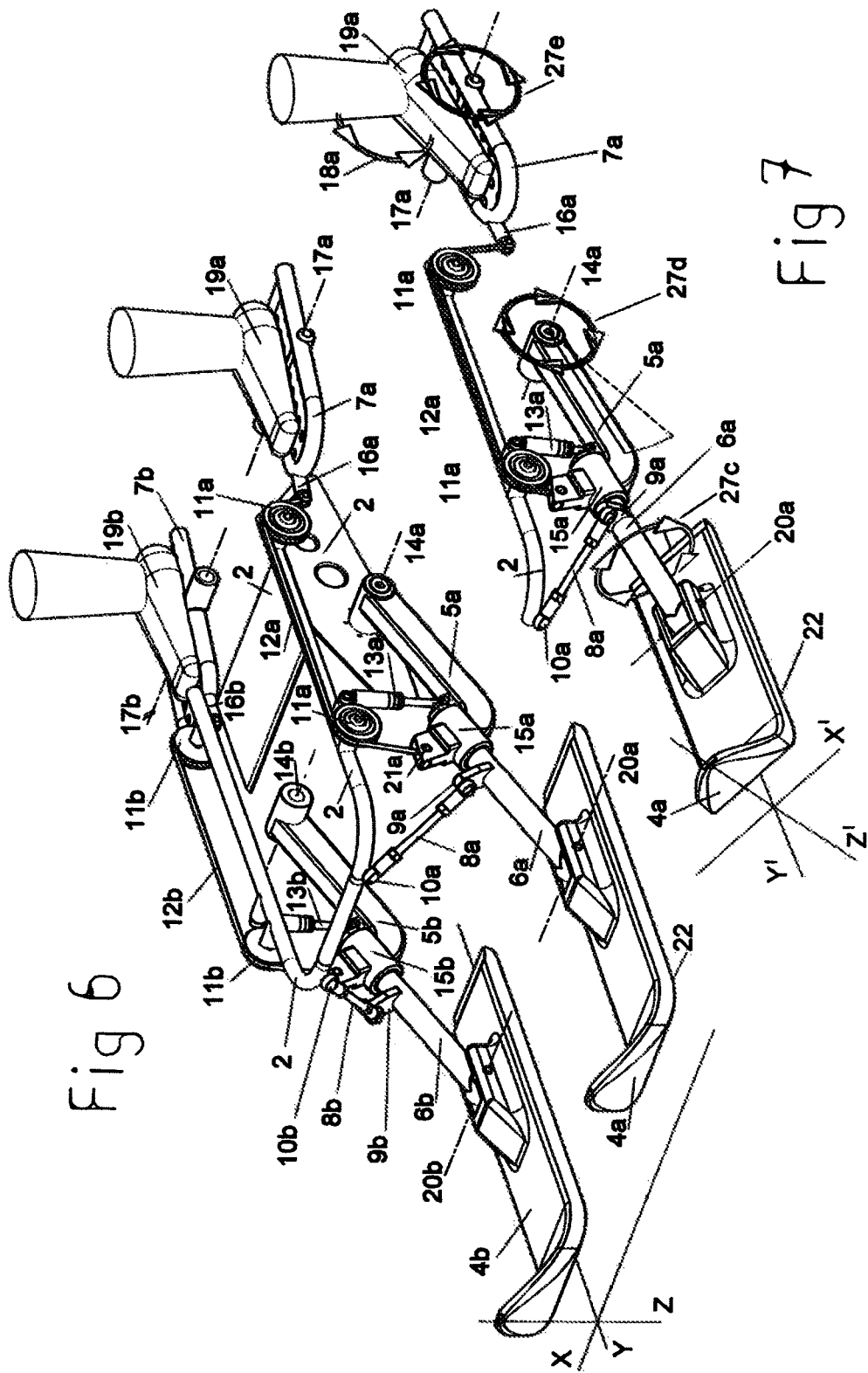

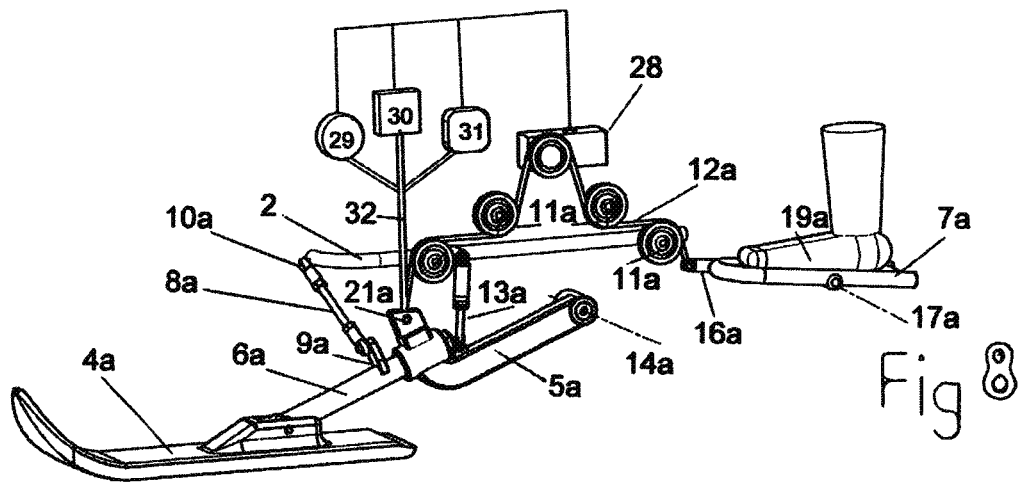
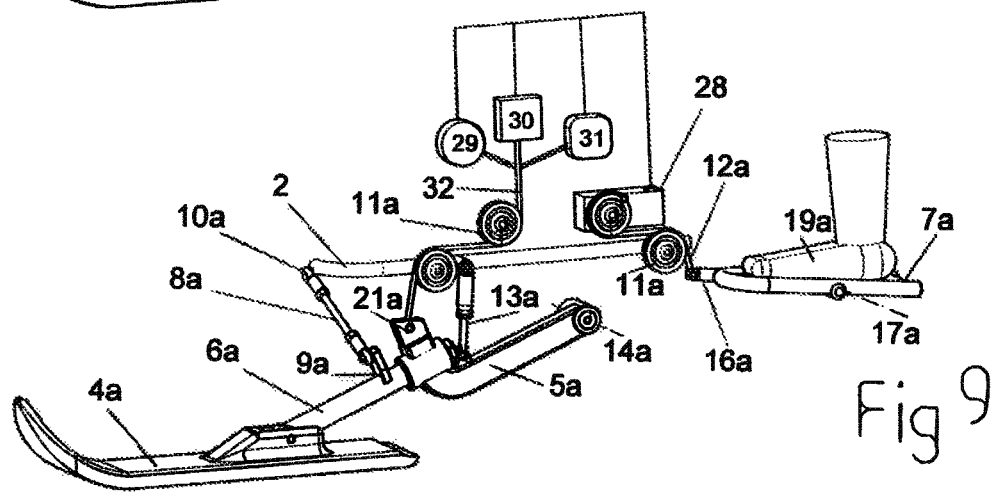
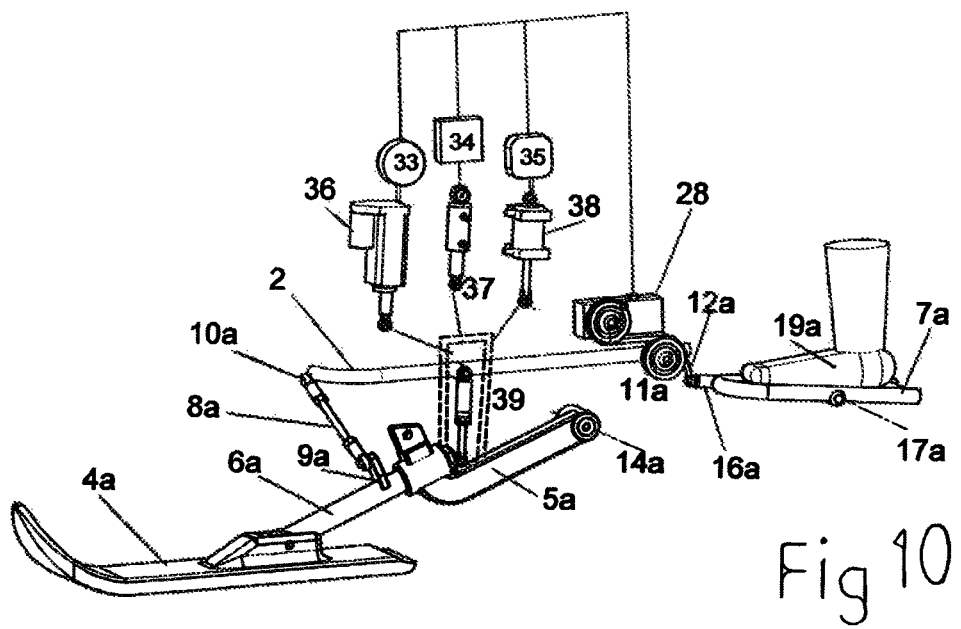

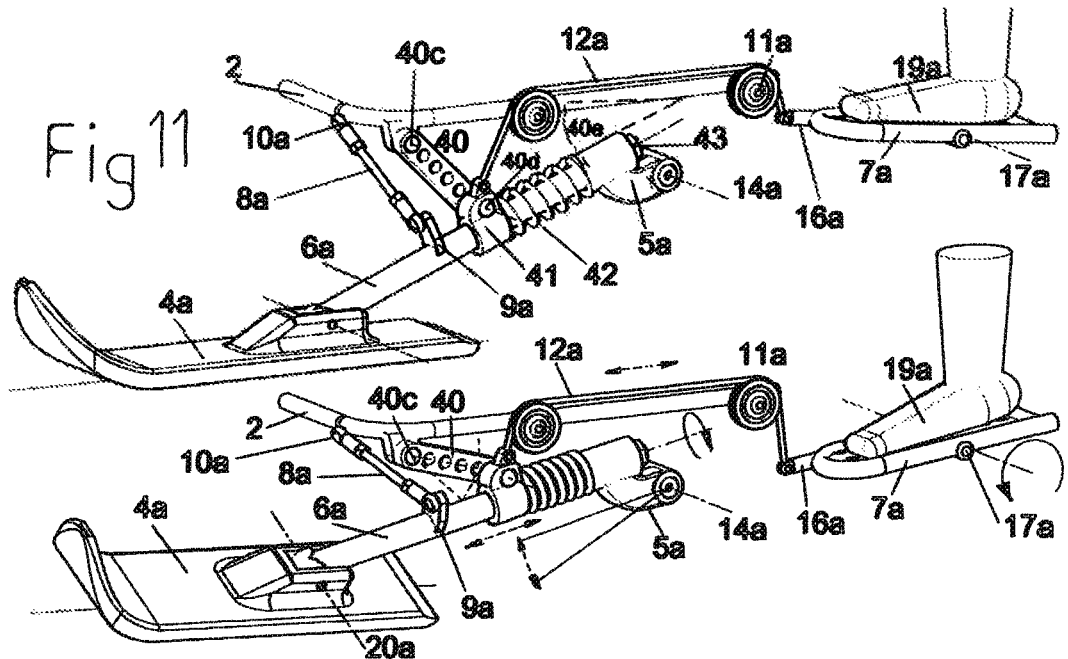
Fig 11
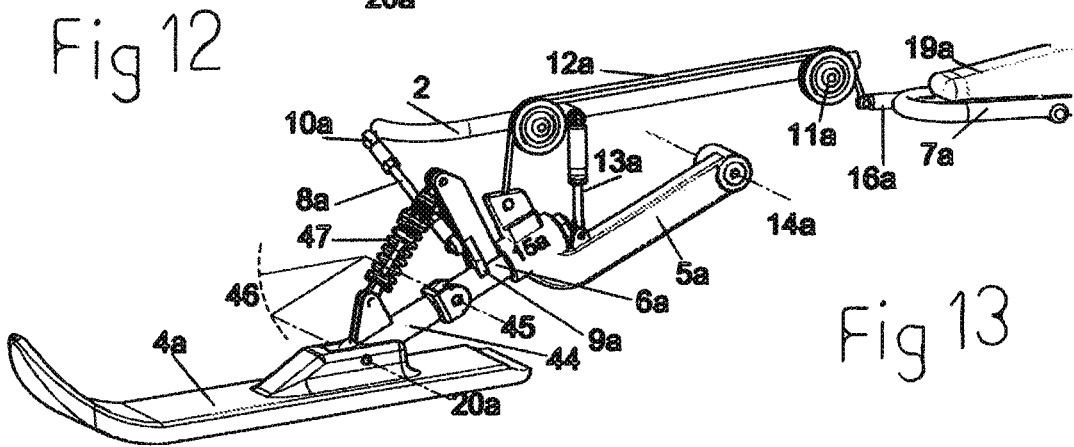
Fig 12
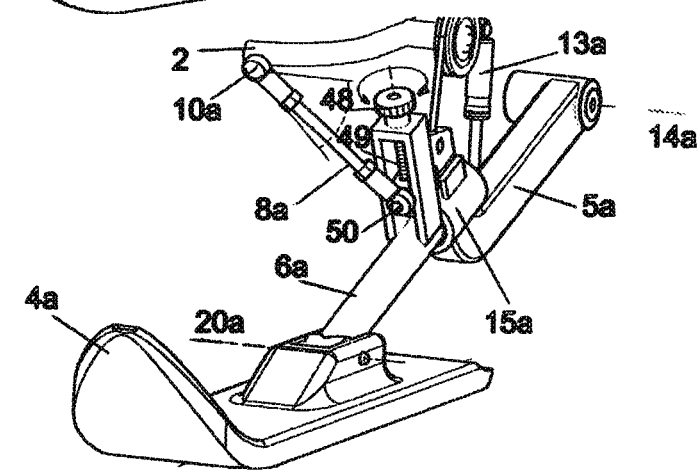
Fig 13
Fig 14

STEERING CONTROL SYSTEM FOR SNOW VEHICLES

CROSS REFERENCE TO RELATED APPLICATIONS

This application is a continuation of International PCT Application No. PCT/ES2017/000155, filed Dec. 23, 2017, which claims priority of Spanish Patent Application P201600910, filed Oct. 26, 2016.

TECHNICAL FIELD OF THE INVENTION

The invention presented in this report belongs to the segment of the motorized vehicle industry involving specially-designed vehicles for travelling on snowy terrain. This type of vehicle is popularly known as a snowmobile. The snowmobile segment varies in terms of vehicle size, engine type, and number of front-mounted skis (one or two), normally coupled to a movable handlebar allowing steering control, seating one or two riders, and equipped with one or two rear continuous tracks that provide traction.

The steering control system presented in this report can be applied to the types of snowmobile that are optionally equipped with at least two front skis for greater stability and a single rear track providing traction. Within this subset is the class of lightweight "stand-up" snowmobiles for operation while standing, which is the class of vehicle that can most benefit from this steering control system owing to its greater degree of maneuverability. In addition, this class of lightweight snowmobile, due to its remarkably lower weight, employs a practical, efficient, economical design which, in comparison to classic snowmobiles of greater weight and volume, leads to a very significant reduction in air pollution emissions, making it better suited to sustainable and ecologically-friendly use.

BACKGROUND OF THE INVENTION

The most popular snowmobile version, used for both personal travel needs and for recreation, is equipped with two front skis and a rear track. With its three points of support on the ground; namely, right ski, left ski and rear track, the result is good stability, safe operation, maneuverability, traction and vehicle buoyancy on the snow. The skis are coupled to the chassis of the snowmobile by means of various components that provide support and allow them to be turned in a specific direction. The skis are in turn attached to a steering device, such as a rotary handlebar, allowing the rider to direct the skis in parallel to the left or right, thus controlling vehicle trajectory. The configuration of the bulk of such traditional steering systems was designed to operate and maneuver the snowmobile horizontally to the plane of the ground, which can negatively impact steering performance; namely:

The rider is subject to considerable lateral centrifugal inertia during turns at medium and high speed. The effect is more evident in the case of stand-up snowmobiles, since rider position raises the center of gravity.
The drive track works horizontally to the ground during turns and generates strong resistance to lateral motion. As a result, this has a negative understeer effect when turning the skis, lessening steering effectiveness.
The skis need to maintain contact parallel to the horizontal ground surface, which in many cases forces the use of an elaborate and complex suspension system. Otherwise, the skis lose contact with the ground and the ability to turn is reduced or lost.

Many traditionally-designed snowmobiles, meaning, those equipped with two front skis, a steerable handlebar to control the skis, a rear track, and a rider seat have attempted to mitigate these issues using the following inventions: U.S. Pat. Nos. 3,550,706; 3,583,507; 25 3,664,446; 3,734,219; 3,777,831.

In each case, the design involves applying a lateral inclination when navigating a turn. More specifically, in U.S. Pat. No. 3,550,706, the skis are fixed to the snowmobile chassis by a perpendicular arm, which provides the skis simultaneous axial and radial movement using a mobile rotating handlebar. The radial motion guides both skis in the direction of travel, but axial motion is applied inversely on each ski, which causes the vehicle to lean to the left or right.

The inventions cited earlier differ greatly from the innovation presented in this report, among other reasons because:

All of them employ a steering control system with a steerable handlebar.
All of them steer the two skis simultaneously.
They lack an automatic return spring mechanism to help stabilize the vehicle horizontally when leaving a curve.
Due to this mechanical configuration, irregularities in the terrain create involuntary and uncontrolled movements in the steerable handlebar.

Patent WO01/81160 (Kuusinen), FIG. 20, applies to the two-ski, stand-up snowmobile segment. This is a stand-up snowmobile with optionally one or two front skis, and classic standard steering using steerable handlebars. This type of snowmobile always operates horizontally to the ground.

Another well-known patent is U.S. Pat. No. 7,815,003 B2, "Motorized Snow Vehicle", employing a different steering mechanism from the above design (www.arcticmotors.com).

(The owner and inventor of that patent is the same applicant who now submits this application and descriptive report for the "Steering control system for snow vehicles")

This transportable and light-weight snow vehicle also has two front skis and a rear track, but changes in trajectory are achieved using two factors simultaneously; namely, a special ski design combined with vehicle inclination when navigating a curve. Neither the handlebar nor the skis are equipped with joints nor axes of rotation. When riders tilt the vehicle laterally with their own body weight, this causes the side of the concave-curved type ski with "carving" edges to navigate a curved path on the snow.

DESCRIPTION OF THE INVENTION

The invention described in this report seeks to offer an efficient solution that allows for the development of smaller, lighter and more economical vehicles as a result of lower fuel consumption, less pollution and greater environmental sustainability. This innovation does not imply any loss in recreational or functional performance for vehicles during their use on the snow.

This steering control system for snowmobiles, preferably the stand-up type, uses two front skis positioned to the left and right of the vehicle and placed longitudinally to the direction of travel, and by means of proper ski positioning when the turning system is activated, lends the vehicle high maneuverability. This system is not present in any previous inventions.

Depending on the intended direction of travel, forward, left or right, the rider, using a manual or assisted steering control system, activates the left or right ski mechanism, given that the skis are symmetrically placed but operate independently. Activation applies a simultaneous movement effect to the ski resulting in rotation along the X, Y, Z axes with respect to its neutral position, with "neutral" referring to their position when the vehicle is traveling in a straight line, or when the system has not yet started the mechanism's rotation cycle.

Each ski has at least one swingarm, said arm or arms can be arranged longitudinally with respect to the snowmobile or transversally, since in both cases they allow an upward and downward displacement of the ski with respect to the planar surface. This greater distance to the ground of one ski compared to the other, which remains in neutral position, is what contributes to the lateral inclination of the vehicle.

During the upward movement of the ski, in this case, using a longitudinal arm, ski rotation around the X axis is provided by the pivot bolt on the swing arm. Simultaneously, other pivot bolts permit ski rotation along the Z and Y axes. The direction of rotation along both the Z and Y axes coincides with the intended direction of snowmobile travel.

Also, the swingarms utilize a gas or mechanical spring, or both types, which act to maintain the arms in neutral position, such that the arms cannot tilt or ascend until the rider unlocks and activates the system, overcoming the resistance provided by the spring(s).These types of spring are provided by the industry in many lengths, capacities, and configurations for a variety of applications.

The steering control system may be manually activated to start the cycle by using a rocker pedal to pull a cable along a path guided by rollers or rods with a rocker arm. It is possible for the pedal to activate a semi-assisted or fully-assisted drive mechanism, such as a hydraulic, pneumatic or electrical circuit using servomotors or pressure pumps. However, the manual system, light in weight and mechanically simple, is the most versatile for use with stand-up type snowmobiles.

The independent pedals are located on the back and side of the snowmobile, where the rider is located. The left foot rests on the left pedal, and the right foot on the right pedal. Using the foot, the rider can swing the pedal because even the most basic version is equipped with at least one pivot bolt. In this manner, by swing the pedal, a pull cable is tensioned, rotating and elevating the swingarm together with the right or left ski, depending on the side activated.

Thanks to the fact that this system inclines the vehicle when cornering, it is particularly suitable for use with stand-up type lightweight snowmobiles that have a high center of gravity as a consequence of the rider's standing position.

Consequently, in light of the different elements involved in this system, such as easy and intuitive pedal activation, low-effort lateral vehicle tilting, rider body position and the simultaneous, triple-effect spatial orientation applied to the skis, the following advantages are obtained:

The system allows sustaining the lateral inclination of the rider and the vehicle throughout the curve, both at high and low speeds, or even when stopped. This is due to the obtuse angle that is formed between the side of the drive track and the side of the ski when the system is activated.

This optimal positioning of the skis allows for efficient steering and change of trajectory by means of its lateral angle and edge.

In a laterally-inclined position, the track generates less sideslip cornering resistance such that the skis are not subject to a negative understeering effect.

Due to the inclination of the vehicle on curves, the rider does not experience the centrifugal inertia that pushes the rider toward the outside of the curve.

BRIEF DESCRIPTION OF THE DRAWINGS

To complement the description provided further below, and in order to provide a better understanding of the characteristics of the invention, a set of drawings is included as an integral part of this descriptive specification, in which figures illustratively depict, in a non-limiting manner, the principal characteristics of the invention.

FIG. 1.—Shows a perspective of the steering control system in neutral position, without activation, as applied to a stand-up style snowmobile.

FIG. 2.—Shows a perspective that illustrates the dynamic effect of the steering control system when it is in operation. It shows the detail of the tracks in the snow and the position of the skis with respect to the X, Y, Z directional axes. The system sustains lateral tilt at very low speed without requiring lateral centrifugal inertia to compensate for rider inclination.

FIG. 3.—Shows a perspective of the steering control system activated in the left ski to turn left. The figure allows comparison between the X, Y, Z axial position of the left ski with respect to the right ski, which is not activated.

FIG. 4.—Shows a full-frontal view of FIG. 3, where the orientation and position taken by the skis when the system is activated can be viewed from another angle.

FIG. 5.—Shows a frontal view of the dynamic effect which, owing to the proper placement of the left ski, has enabled the rider to tilt the snowmobile easily, supported by the left ski and the left side of the track, which form an obtuse angle.

FIG. 6.—Shows a perspective of the steering control system and its components in neutral position. The right side is symmetrical to the left. Each side is equipped with its activation pedal.

FIG. 7.—Shows a perspective of the steering control system and its components, in this case on the left side, coinciding with the moment of activation. The rotational direction of some moving components is indicated.

FIG. 8.—Illustrates a semi-assisted mechanism, which activates the steering control system using another pull cable or additional rod, thus assisting manual operation by the rider.

FIG. 9.—Illustrates another fully-assisted mechanism; in which case the steering control system acts on the pull cable, but In this case, the rider no longer applies direct force.

FIG. 10.—Shows another variant of the fully-assisted mechanism, but this time the return spring is replaced by a linear movement component which regulates the position of the swingarm.

FIG. 11.—Shows a perspective of a variant of the steering control system for snowmobiles. This variant is based on the same principles as the system described herein, with the gas spring replaced by a concentric spring on the ski spindle column.

FIG. 12.—Offers another perspective for FIG. 11, this time with the system activated and the spring compressed.

FIG. 13.—Shows an alternative version adding a shock absorbing component to the steering control system.

FIG. 14.—Shows an accessory component that allows for varying some the geometric properties of the steering control system, such as degrees of rotation of the ski and its sensitivity.

DESCRIPTION OF A PREFERRED EMBODIMENT

Figure 15:
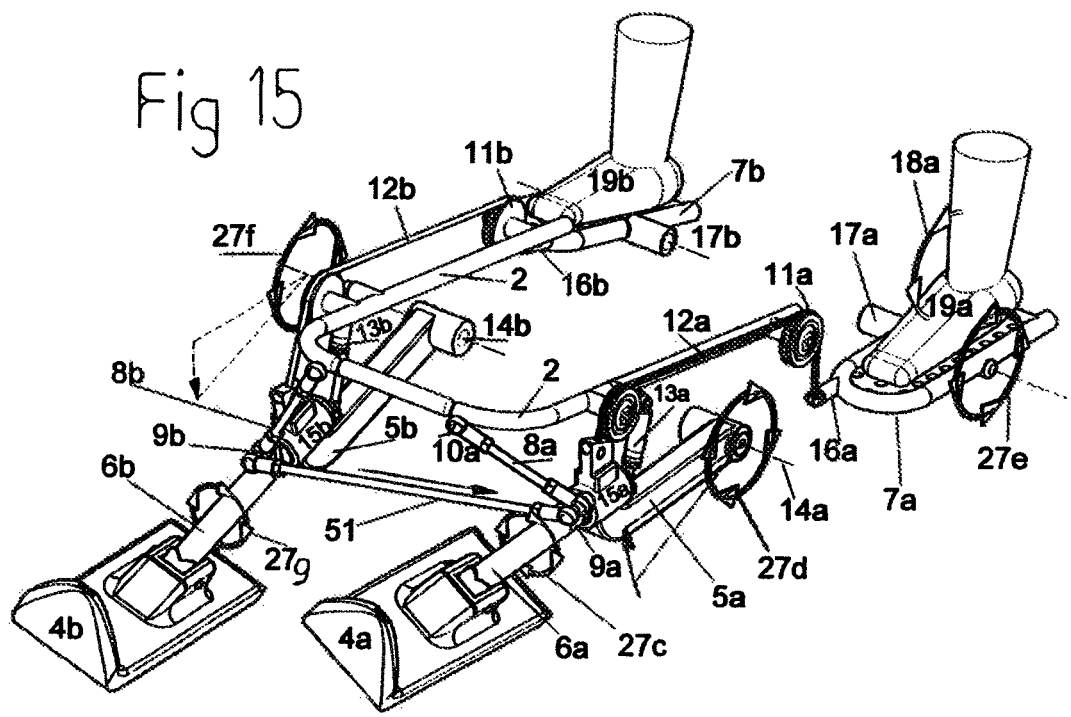
FIG. 15.—Shows the steering control system with the cam synchronizer strut installed with the system activated on the left. Both ski spindles rotate synchronously in the same direction. In this case, the two skis are activated using a single pedal.

In light of the above figures and in accordance with their numbering, a preferred embodiment of the invention can now be described.

FIG. 1 depicts a stand-up style snowmobile (1), in which the various symmetrical components installed for the steering control system can be seen, in addition to other essential snowmobile components, such as the two front skis (4*a* and 4*b*), the rear track (3) that provides traction and stability, and the chassis (2) that supports system components and mechanisms. Of particular interest are the swingarms (5*a*, 5*b*), guide rollers (11*a*, 11*b*), pull cable (12*a*, 12*b*), left compression spring (13*a*), and the rocker pedals (7*a*, 7*b*) located on the left and right of the longitudinal axis of the snowmobile on which the rider's feet are positioned. The pedals (7*a*, 7*b*) are fastened using pivot bolts (17*a*, 17*b*), making it possible to rock each pedal independently of the other.

FIG. 1 shows the steering control system in neutral state; that is, not activated and with the directional movement cycle not having started.

In FIG. 2, the rider (23) is properly placing each foot on the pedals (7*a*, 7*b*) and activating the control system cycle with the left pedal (7*a*), which produces the lateral tilt of the vehicle and simultaneously a specific orientation of the vehicle's left ski (4*a*). This allows it to turn in a very tight radius at very low speed. The traces left in the snow show how the right ski (4*b*) has stopped leaving an impression (24) as the curve is navigated as a result of the lateral inclination to the left. The impressions (25) made by the left ski (4*a*) change from being flat and horizontal to being traced only by the left ski (4*a*) side and edge (22). The traces in the snow (26) left by the continuous drive track (3) change from being flat and horizontal to an impression left only laterally by the drive track due to vehicle inclination.

It would be logical and straightforward to come up with an alternative embodiment of this same steering control system, but this time eliminating the rocker pedals and allowing the system to trigger the control mechanism cycle as well as compress the spring (13*a*) or (13*b*) solely in response to riders laterally transferring their weight on the chassis to the left or right ski as a point of support and making pressure against the snow. However, when the snow cover varies greatly in compactness or density, the weight transferred to the ski would sink it into the snow instead of the ski remaining static and the compression spring being compressed (13*a*), which is the desired effect.

This embodiment without pedals would be possible if the snowy terrain through which the vehicle navigates is completely compacted and guarantees a certain degree of hardness. But due to the fact that the qualities of stability and resistance to pressure that the snow might exhibit vary enormously, even within the same environment, riders would not be able to consistently achieve the required spring compression (13*a*) or (13*b*) which is what is needed for the system to return to neutral automatically at the end of a curve. This spring action is what keeps the vehicle level and skis in neutral position when travelling in a straight line or standing still. It is for this reason that manual pedal activation of the system was included as part of the steering control system, given that it allows for total precision over the moment of activation, always at rider behest and without being influenced by the type of snow being traversed.

In addition to the above, the particular nature of these pedals is that they provide a triple function, as detailed below.

As their primary function, the pedals allow manually achieving a rocker effect using the pivot bolt (17*a*) in the case of the left pedal, placing weight using the toe of the foot in order to start the tilt mechanism and returning to neutral automatically by releasing foot pressure. Pedal action is very intuitive and a convenient control method.

The pedals provide the rider with support when riding in a straight line or when swinging the snowmobile towards the left or right side, as appropriate, without the need to activate any system mechanism in this case. This is useful on a very soft types of snow and/or during very wide radius turns.

Due to the pivot bolt (17*a*, 17*b*) employed, the system allows the rider to lean back, an appropriate position to take during steep descents or when traversing deep snow, varying the center of gravity of the body toward the front or rear of the snowmobile as needed.

In this manner, if, for example, the rider intends to go left, he/she rotates the pedal (7*a*) (27*e*) FIG. 3, and the tilt mechanism cycle of the steering control system activates on the left side. This creates a clear imbalance in the weight placed on the snow by each ski (4*a*, 4*b*). This imbalance is owed to the rotation of the swingarm (5*a*) along the X axis (14*a*) and an upward displacement of the ski (4*a*). Simultaneously, by means of other joints, the left ski (4*a*) also undergoes rotation along the Z and Y axes. Unlike the right ski (4*b*), which remains in neutral position.

In FIGS. 4 and 5, one can see that, due to the distance of the left ski from the ground, the rider (23) has no difficulty tilting the snowmobile to the left while achieving stable support using the left ski (4*a*) and the left side of the drive track (3). In turn, the edge (22) of the ski (4*a*) that coincides with the Y axis orientation of the ski is what determines the path to follow.

This steering control system allows the rider to navigate curves very slowly while inclined, without the aid of centrifugal inertia to compensate for the inclination. The rider may even remain standing while turning sharply without falling inward, as shown in FIG. 5, due to the obtuse angle created between track side and the left side of the ski, which provides lateral stability.

The detailed view of the steering control system activation cycle, FIGS. 6 and 7, illustrates the main components coupled to a section of the snowmobile chassis (2). The left and right sides are symmetrical, and are in neutral position in FIG. 6, with the system inactive. This is the same position as when the vehicle travels in a straight line.

Depending on the intended direction of travel, the rider rocks one foot pedal or the other with the foot. System activation is very easy and intuitive.

To change trajectory, for example, to the left, the left side of the system is used, as can be seen in FIG. 7. The left foot (19*a*) of the rider exerts pressure (18*a*) with the toe by rocking (27e) the pedal (7a) around the pivot bolt (17a). A cam (16a) attached to the pedal (7a) pulls a control cable (12a) which is routed through rollers and guides (11a) fixed to the chassis (2) of the snowmobile (1). The cable terminates at its anchor to a section (21a) of the main swingarm (5a). The swingarm, which in this embodiment is arranged longitudinally to the direction of travel, is fixed at one of its ends to the chassis (2) of the snowmobile (1) by means of a pivot bolt (14a), allowing it to rotate (27d). When the cable (12a) is tensioned by pedal rocking (7a), this forces the main swingarm (5a) to rotate and ascend with respect to the planar surface, and in turn compresses the spring (13a).

A box or housing is fixed (15a) at the other end of the swingarm (5a) which allows inserting the ski spindle (6a), which is longitudinally oriented and can rotate radially on its own pivot bolt. The other end of the ski spindle (6a) is coupled to the ski (4a). This is done in such a way that when the ski spindle (6a) turns, so does the ski, in the same direction as the spindle (6a), as in (27c) FIG. 7.

The connection of the ski spindle (6a) to the ski (4a) can be fixed or be done using a pivot bolt (20a), which allows the ski to swing with respect to the spindle and maintain flatness with the ground.

The ski spindle (6a) also has a cam (9a), which is connected to a tie rod (8a), the other end of the rod is connected to a fixed section (10a) of the snowmobile (1) chassis (2). In conclusion, the swingarm (5a), the ski spindle (6a) and the ski (4a) are placed longitudinally to the direction of travel. This occurs whenever the system is in a neutral condition. When the swingarm (5a) ascends, so does the ski spindle (6a). As the arm ascends, the tie rod (8a), in line with its length, displaces the spindle (6a), which due to its connection to the cam (9a), rotates radially (27c) towards the exterior, which in this case is to the left. The radial rotation (27c) of the spindle (6a) acts on the ski (4a) in the following manner: considering that the union of the spindle (6a) with the ski (4a) is at an acute angle, the resulting effect on the ski is that it rotates along axis Y as well as axis Z, as in FIGS. 3, 4, 7.

While tension is maintained on the pull cable, the main swingarm remains raised and the spring (13a) compressed. When the pull cable (12a) releases as the rider stops pressing the pedal (7a), the spring (13a), due to the force it exerts, returns the main swingarm (5a) to its initial neutral position, and the tie rod (8a) returns the cam (9a) and ski spindle (6a) to their neutral initial position, thereby also returning the ski (4a) to its initial neutral position, as in FIG. 6.

In view of various technological advances, it is also possible to employ a variety of assistance mechanisms to this steering control system. One possible embodiment is shown on the left ski (4a), with a semi-assisted mechanism, FIG. 8, where the rider, using the pedal (7a) directly tensions the pull cable (12a), but can be assisted by some type of electromechanical system (29), such as a hydraulic (30) or pneumatic (31) mechanism. When the sensor (28) detects movement in the cable (12a), it activates the assistance mechanism, which might be (29), (30), or (31), acting through a parallel pull cable (32).

Another embodiment with a fully assisted mechanism is shown in FIG. 9, illustrating how the manual pedal (7a) no longer has direct connection via the pull cable (12a) to the swingarm (5a). When the pedal is moved, the sensor (28) detects that movement and sends a signal that activates an electromechanical (29), hydraulic (30), or pneumatic (31) mechanism, that, using a pull cable or similar device (32), acts to raise the swingarm (5a).

Another embodiment with a fully assisted mechanism is shown in FIG. 10, illustrating how the pedal (7a) no longer has a direct connection via the pull cable (12a) to the swingarm (5a). When the pedal is moved, the sensor (28) detects the movement and sends a signal to an electrical circuit (33), hydraulic pump (34) or pneumatic pump (35), but in this case these components no longer act upon the pull cable to provide assistance (32). In this case, the return spring (39) is eliminated and a linear electric actuator (36), double-acting hydraulic cylinder (37), or a double-acting pneumatic cylinder (38), or some other device is installed in its place, in any case serving to displace the swingarm (5a). These components then receive commands from their corresponding control systems (33), (34), (35). Any of these alternative systems would allow for driving upward and downward movement in the swingarm (5a).

Another embodiment is shown in FIGS. 11 and 12. Only the left side of the system is shown, as the right side is symmetrical to it. The resulting performance benefits for the skis are the same as in the previous cases; namely, an optimal ski positioning along the X, Y, Z axes is achieved. The same basic configuration using a swingarm (5a), ski spindle (6a) and tie rod (8a) is maintained, but in this case the return spring shown in FIG. 6 (13a) has been replaced by a compression spring (42) in FIG. 11, installed concentrically to the ski spindle (6a). Obviously, an extension spring could also be installed. A connecting rod is added (40), which is connected at one end to the chassis (2) using a pivot bolt (40c) around which it rotates. The other end of the connecting rod (40) is also connected by means of a pivot bolt (40d) to a bushing or sliding sleeve (41) allowing axial and radial displacement of the ski spindle (6a).

When the swingarm (5a) ascends, rotating on the pivot bolt (14a), this reduces the angle (40e) existing between the chassis (2) and the ski spindle (6a), forcing the connecting rod to tilt and consequently, equal to its length, slide the bushing or guide that compresses the concentric spring (42). Also, a nut (43) concentric to the ski spindle (6a) allows adding or reducing spring compression (42) to obtain greater or lesser hardness in the mechanism. The system is depicted In FIG. 11 in neutral position with no activation, with the spring extended (42). In FIG. 12, the system is shown with the spring now compressed (42), the swingarm (5a) raised by rotating on its pivot bolt (14a), and the ski (4a) with the resulting rotational orientation along the Z and Y axes.

When the rider ceases to exert pressure on the pedal (7a), the compressed spring (42) forces the entire mechanism to return to its initial neutral position, as in FIG. 11. It should be noted that the spring (42) is placed concentrically around the spindle (6a), to make it self-supporting and at the same time allow radial rotation in the spindle itself (6a). However, the spring (42) could be replaced by a gas spring or similar, placed in parallel or longitudinally to the ski spindle (6a) .The support for the return spring would be coupled to the guide bushing (41) and the other support point for the spring would be coupled to the swingarm (5a).

Regarding the embodiments discussed above, it would also be logically possible to employ other devices or components that would serve to increase the performance and comfort of the overall steering system. Thus, as per FIG. 13, the configuration of the steering control system discussed herein allows for the incorporation of some type of shock absorber component (47) that would lead to greater contact of the ski with the terrain, as well as greater rider comfort. The ski spindle (6a) seen in previous embodiments is now comprised of two parts, a movable piece (44) connected to the ski by a pivot bolt (20a) and another fixed rotary piece (6a) coupled to the housing (15a) of the main swingarm (5a). Both parts, fixed and movable, are coupled using a joint with a pivot bolt (45). The shock absorber component (47) is coupled to the movable piece (44) and to the rotating fixed piece (6a), in such a manner that when the ski (4a) travels over a bump, it rotates on the pivot bolt (45) and transmits the force to the shock absorbing component (47).

Another embodiment, as shown in FIG. 14, provides a practical device that allows for quickly varying the angle of incidence between the tie rod (8a) and the ski spindle (6a) cam (9a). By rotating the knob (48), the rider may make the displaceable shaft (50) ascend or descend using the screw (49), which acts like a cam. The variation in this angle, together with the regulation provided by the length of the tie rod (8a), allow increasing and decreasing of the degrees of rotation of the ski spindle (6a), which governs the sensitivity of ski displacement.

Figure 16:
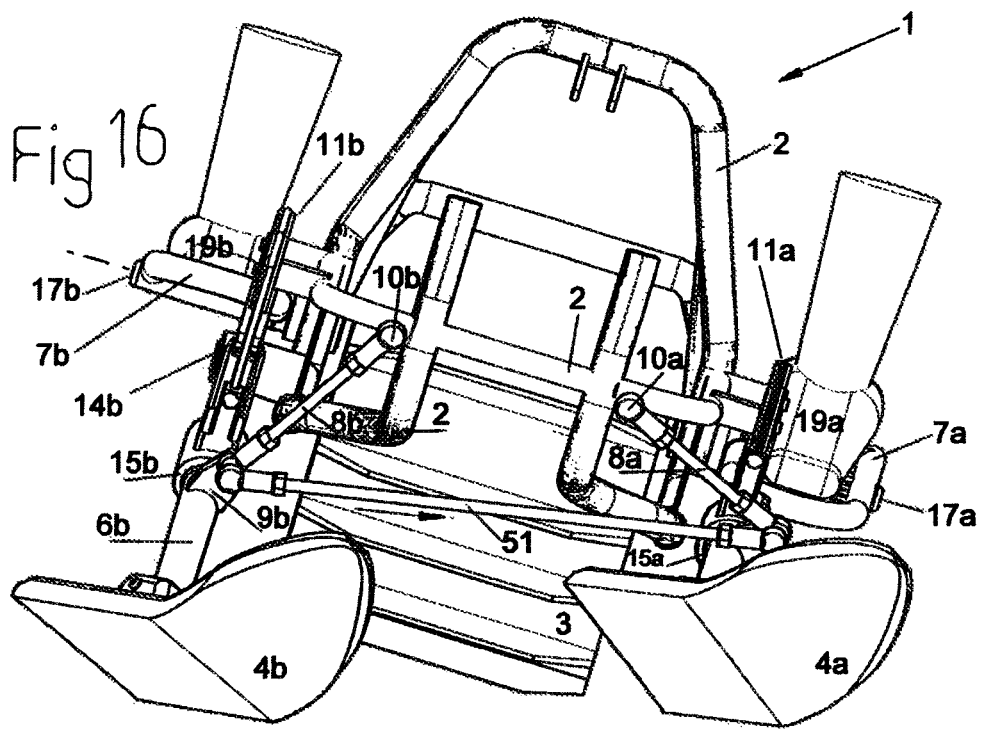
FIG. 16.—Shows a frontal view of the snowmobile with the cam synchronizer strut in action. An inclined position can be observed owing to the fact that the right ski has descended from the static or neutral position, while the left ski is in an elevated position while simultaneously being oriented and inclined to the left. The track is similarly tilted to the left side.

Finally, another type of embodiment is possible, based on the embodiments above, as shown in FIGS. 15 and 16. In this case, a new accessory component allows the two skis to be oriented simultaneously in the same direction instead of just one. This would provide greater turning strength for heavier snowmobiles or larger drive tracks that require more of the skis to prevent understeer.

This embodiment uses the same mechanism and components that provide multiple-effect orientation to the ski along the X, Y, Z axes, as per FIGS. 6 and 7. However, a new component is added, consisting of a cam synchronizer rod (51), FIGS. 15 and 16. By means of a rod brace or cable, this bracing cam connects the cam (9b) of the right ski spindle (6b) to the cam (9a) of the left ski spindle (6a). In this way, the rotation (27c) of the left spindle (6a) is done in the same direction (27g) as right spindle (6b), and vice versa.

In turn, when the ski spindle (6b) rotates due to the effect of the cam synchronizer rod (51), the tie rod (8b) acts using the radial length of the cam (9b) to force the swingarm to descend or rotate downwards (5b).

Thus, this new component (51) allows the two skis to be oriented in the same direction, as well as allowing one ski to be raised (4a) and the opposite one to be lowered (4b), which would provide the snowmobile (1) with lateral inclination, as per FIG. 16. In this embodiment, one can observe that, basically, with the activation of a single pedal, the rider can orient both skis towards the same trajectory.

In light of the many embodiments discussed, it can be easily understood that combinations thereof are distinctly possible.

A list of the various components comprising the invention and appearing in the Figures is provided below.
1.—"Stand-up" or "standing" style snowmobile
2.—Snowmobile chassis
3.—Drive track
4a.—Left ski
5a.—Left swingarm
6a.—Left ski spindle
7a.—Left rocker pedal
8a.—Left tie rod
9a.—Left ski spindle cam
10a.—Left spindle chassis support
11a.—Rollers, left side
12a.—Pull cable, left side
13a.—Compression spring, left side
14a.—Left rotating swingarm pivot bolt
15a.—Left swingarm housing
16a.—Left pedal cam
17a.—Left pedal pivot bolt
18a.—Foot movement
19a.—Left foot
20a.—Left ski pivot bolt
21a.—Left pull cable connection
4b.—Right ski
5b.—Right swingarm
6b.—Right ski spindle
7b.—Right rocker pedal
8b.—Right tie rod
9b.—Right ski spindle cam
10b.—Right spindle chassis support
11b.—Rollers, right side
12b.—Pull cable, right side
13b.—Compression spring, right side
14b.—Right rotating swingarm pivot bolt
15b.—Right swingarm housing
16b.—Right pedal cam
17b.—Right pedal pivot bolt
19b.—Right foot
20b.—Right ski pivot bolt
21b.—Right pull cable connection
22.—Ridge, left ski edge
23.—Rider (driver)
24.—Right ski snow impression
25.—Left ski snow impression
26.—Drive track snow impression
27c.—Component 6a rotational direction
27d.—Component 5a rotational direction
27e.—Component 7a rotational direction
27f.—Component 7b rotational direction
27g.—Component 6b rotational direction
28.—Sensor with control unit
29.—Electric assisted steering control system
30.—Hydraulic assisted steering control system
31.—Pneumatic assisted steering control system
32.—Pull cable
33.—Power supply circuit
34.—Hydraulic pump
35.—Pneumatic pump
36.—Electric linear actuator
37.—Hydraulic cylinder
38.—Pneumatic cylinder
39.—Replaceable return spring
40.—Connecting rod
40c.—Fixed pivot bolt, connecting rod
40d.—Moving anchor pivot bolt, connecting rod
40e.—Angle between chassis and swingarm
41.—Sliding bushing for compression
42.—Spring
43.—Compression nut
44.—Articulated swingarm
45.—Pivot bolt
46.—Tilt travel
47.—Shock-absorbing component
48.—Rotary knob
49.—Endless screw
50.—Movable pivot bolt
51.—Cam synchronizer brace

What is claimed is:

1. A steering control system for a snow vehicle having least two front skis (4a, 4b) and one rear track (3), characterized in that the system comprises:
a pair of independent swingarms (5a, 5b), located to a right and left of the longitudinal axis of the snow vehicle (1) and coupled by one of their ends to a chassis (2) of the snow vehicle (1), which by means of a pivot bolt (14a, 14b) at said end can tilt with an ascending and descending movement with respect to a horizontal surface plane;

a pair of ski spindles (6a, 6b) equipped with cams (9a, 9b), with the spindles arranged longitudinally to a direction of travel and capable of radially rotating (27c) while coupled at an opposite end (15a, 15b) of the swingarms (5a, 5b);

a pair of independent rocker foot pedals (7a, 7b) located to the right and left of the longitudinal axis of the snow vehicle (1) and connected to a set of pull cables or drive shafts (12a,12b), the pedals coupled to the chassis (2) of the snow vehicle (1) by means of at least one pivot bolt (17a, 17b) on which the pedals can swing;

a pair of independent tie rods (8a, 8b), connected at one end to a section of the snow vehicle (1) chassis (10a, 10b) and at an opposite end to the respective cam (9a, 9b) located on each ski spindle (6a, 6b); and a pair of return members (42, or 13a,13b) allowing locking and return rotation of the respective swingarms (5a, 5b);

wherein the set of pull cables (12a, 12b) or drive shafts are routed over guide rollers (11a, 11b) or rockers which transmit pedal movement (7a, 7b) to the respective swingarms (5a, 5b).

2. The steering control system for snow vehicles, according to claim 1, characterized in that at an end of both ski spindle (6a, 6b), skis (4a, 4b) are arranged longitudinally with respect to the direction of travel and coupled with pivot bolts (20a, 20 b) allowing movement.

3. The steering control system for snow vehicles, according to claim 2, characterized in that when placing the skis and the snow vehicle on a horizontal surface, the angle formed between the tail of the ski (4a, 4b) and the ski spindle (6a, 6b) results in an acute angle; or, the angle formed between the front half of the ski (4a, 4b) and the spindle (6a, 6b) results in an obtuse angle.

4. The steering control system for snow vehicles, according to claim 3, characterized in that the system allows the incorporation of a cam synchronizer strut (51) which transmits and synchronizes the direction of rotation of the ski spindle (6a) or (6b), depending on which side has been activated, to the spindle on the opposite side, also causing the swingarm on said opposite side to effect a downward displacement with respect to a neutral position of said swingarm.

5. Steering control system for snow vehicles, according to claim 1, characterized in that when placing the skis and the snow vehicle on a horizontal surface, an angle formed between a tail of the ski (4a, 4b) and the ski spindle (6a, 6b) results in an acute angle; or, an angle formed between a front half of the ski (4a, 4b) and the spindle (6a, 6b) results in an obtuse angle.

6. The steering control system for snow vehicles, according to claim 1, characterized in that when the tie rod ends (8a, 8b) act on the cams (9a, 9b) according to their length, the tie rod ends and the cams cooperatively cause radial rotation of the ski spindles (6a, 6b), with this rotational direction (27c) coinciding with the intended steering direction of the snow vehicle.

7. The steering control system for snow vehicles, according to claim 1, characterized in that due to the action of the pull cable (12a, 12b) produced by the rocker pedals (7a, 7b), the swingarm (5a, 5b) is rotatable on the pivot bolt (14a, 14b), consequently raising or lowering the desired ski (4a, 4b) with respect to a planar surface.

8. The steering control system for snow vehicles, according to claim 1, characterized by a configuration in which use of the rocker pedal (7a, 7b) activates (28) a semi-assisted or fully-assisted system (29), (30), (31), which may be driven by a hydraulic, pneumatic or electric circuit using servomotors or pressure pumps.

9. The steering control system for snow vehicles, according to claim 1, characterized by inclusion of a fully-assisted steering control system (33, 34, 35) to be activated by means of the rocker pedals (7a, 7b) and connected to control powered assist devices (36, 37, 38) to control displacement of the swingarms (5a, 5b).

10. The steering control system for snow vehicles, according to claim 1, characterized in that the ski spindles (6a, 6b) allow the incorporation of a shock-absorbing component (47) that absorbs the impact from surface irregularities by means of an articulated swingarm (44) and a pivot bolt (45).

11. The steering control system for snow vehicles, according to claim 1, characterized in that the ski spindles (6a, 6b) allow the incorporation of a component that easily and quickly varies the height of a connection point between the cam (9a, 9b) and the tie rod (8a, 8b) by means of a pivot bolt (50) and screw (49), thereby also varying an angle formed between the ski spindles (6a, 6b) and tie rods (8a, 8b).

12. The steering control system for snow vehicles, according to claim 1, characterized in that the system allows the incorporation of a cam synchronizer strut (51) which transmits and synchronizes the direction of rotation of the ski spindle (6a) or (6b), depending on which side has been activated, to the spindle on the opposite side, also causing the swingarm on said opposite side to effect a downward displacement with respect to a neutral position of said swingarm.

13. The steering control system for snow vehicles, according to claim 1, characterized in that, by activating the vehicle (1) steering control system, a considerable lateral inclination in the vehicle results at the same time that providing in the corresponding ski, (4a) or (4b), a simultaneous motion, resulting in rotation along the X, Y, Z axes with respect to their neutral starting position.

* * * * *